(12) United States Patent
Cox, III et al.

(10) Patent No.: US 10,378,873 B2
(45) Date of Patent: Aug. 13, 2019

(54) METHODS AND APPARATUS TO MONITOR MATERIAL CONDITIONING MACHINES

(71) Applicant: The Bradbury Company, Inc., Moundridge, KS (US)

(72) Inventors: Clarence B. Cox, III, McPherson, KS (US); Gregory S. Smith, McPherson, KS (US)

(73) Assignee: THE BRADBURY COMPANY, INC., Moundridge, KS (US)

( * ) Notice: Subject to any disclaimer, the term of this patent is extended or adjusted under 35 U.S.C. 154(b) by 1118 days.

(21) Appl. No.: 14/703,547

(22) Filed: May 4, 2015

(65) Prior Publication Data

US 2015/0231677 A1   Aug. 20, 2015

Related U.S. Application Data

(63) Continuation-in-part of application No. 13/839,809, filed on Mar. 15, 2013, now Pat. No. 9,021,844.

(51) Int. Cl.
*B21D 37/00*   (2006.01)
*G01B 5/20*   (2006.01)
(Continued)

(52) U.S. Cl.
CPC .................. *G01B 5/20* (2013.01); *B21B 1/24* (2013.01); *B21B 37/16* (2013.01); *B21D 1/02* (2013.01);
(Continued)

(58) Field of Classification Search
CPC ........ G01B 5/20; G01B 11/306; G01B 21/20; B21D 1/02; B21D 1/05; B21B 37/28; B21B 37/16; B21B 1/24
(Continued)

(56) References Cited

U.S. PATENT DOCUMENTS 3,577,773 A   5/1971   Kubo et al.
3,798,450 A   3/1974   Reynolds et al.
(Continued)

FOREIGN PATENT DOCUMENTS

EP   1281345   2/2003
EP   3342495   7/2018
(Continued)

OTHER PUBLICATIONS

European Patent Office, "Extended European Search Report," issued in connection with European Patent Application No. 14 159 949.8, dated Jul. 24, 2014, 7 pages.
(Continued)

*Primary Examiner* — David B Jones
(74) *Attorney, Agent, or Firm* — Hanley, Flight & Zimmerman, LLC

(57) ABSTRACT

Methods and apparatus to monitor conditioning machines are disclosed herein. An example system includes a plurality of work rolls to process a continuous strip material positioned between an entry and an exit of an apparatus. A sensor determines a measured distance between an upper surface of the strip material and a reference location, where the sensor is downstream from the exit of the apparatus. A controller determines a difference value between the measured distance and a predetermined distance to detect material curvature in the strip material.

23 Claims, 9 Drawing Sheets

(51) Int. Cl.
  *B21B 37/16* (2006.01)
  *B21B 1/24* (2006.01)
  *B21D 1/02* (2006.01)
  *B21D 1/05* (2006.01)
  *G01B 11/30* (2006.01)
  *G01B 21/20* (2006.01)

(52) U.S. Cl.
  CPC .............. *B21D 1/05* (2013.01); *G01B 11/306* (2013.01); *G01B 21/20* (2013.01)

(58) Field of Classification Search
  USPC .................................................... 72/12, 12.7
  See application file for complete search history.

(56) References Cited

U.S. PATENT DOCUMENTS

| | | | |
|---|---|---|---|
| 4,541,723 | A | 9/1985 | Pirlet |
| 5,465,214 | A | 11/1995 | Jeuniaux et al. |
| 5,687,595 | A | 11/1997 | Noe et al. |
| 5,829,286 | A | 11/1998 | Noe et al. |
| 5,953,946 | A | 9/1999 | Mucke et al. |
| 6,029,485 | A | 2/2000 | Bohmer |
| 6,766,278 | B2 | 7/2004 | Liu et al. |
| 6,948,347 | B2 | 9/2005 | Russo et al. |
| 8,375,754 | B2 | 2/2013 | Clark et al. |
| 9,021,844 | B2 | 5/2015 | Smith et al. |
| 2009/0113973 | A1 | 5/2009 | Cox, III |
| 2009/0120149 | A1* | 5/2009 | Clark ...................... B21B 37/28 72/7.4 |
| 2009/0249849 | A1 | 10/2009 | Martin et al. |
| 2012/0047977 | A1 | 3/2012 | Smith et al. |
| 2014/0260473 | A1 | 9/2014 | Smith et al. |

FOREIGN PATENT DOCUMENTS

| | | |
|---|---|---|
| JP | 60073309 | 4/1985 |
| JP | 61123418 | 6/1986 |
| JP | 06034360 | 2/1994 |
| JP | 11281345 | 10/1999 |

OTHER PUBLICATIONS

Australian Intellectual Property Office, "Patent Examination Report No. 1," issued in connection with Australian Application No. 2014201565, dated Jun. 26, 2014, 4 pages.
Australian Intellectual Property Office, "Notice of Acceptance," issued in connection with Australian Patent Application No. 2014201565, dated Feb. 19, 2015, 3 pages.
Keyence, "IL-065 Sensor Head," [http://www.keyence.com/products/measure/laser-1d/il/models/il-065/index.jsp], retrieved on Aug. 30, 2013, 2 pages.
Keyence, "IL-1000 Amplifier Unit, Din Rail Type," [http://www.keyence.com/products/measure/laser-1d/il/models/il-1000/index.jsp], retrieved on Aug. 30, 2013, 2 pages.
Keyence, "IL-1050 Amplifier Unit, Din Rail Type," [http://www.keyence.com/products/measure/laser-1d/il/models/il-1050/index.jsp], retrieved on Aug. 30, 2013, 2 pages.
United States Patent and Trademark Office, "Non-Final Office Action," issued in connection with U.S. Appl. No. 13/839,809, dated Sep. 23, 2014, 14 pages.
United States Patent and Trademark Office, "Notice of Allowance," issued in connection with U.S. Appl. No. 13/839,809, dated Dec. 26, 2014, 8 pages.
United States Patent and Trademark Office, "Restriction and/or Election Requirement," issued in connection with U.S. Appl. No. 14/703,570, dated May 7, 2018, 6 pages.
United States Patent and Trademark Office, "Non-Final Office Action," issued in connection with U.S. Appl. No. 14/703,570, dated Aug. 9, 2018, 9 pages.
European Patent Office, "Extended European Search Report," issued in connection with European Patent Application No. 17205470.2, dated Jun. 6, 2018, 7 pages.
United States Patent and Trademark Office, "Final Office Action," issued in connection with U.S. Appl. No. 14/703,570, dated Jan. 2, 2019, 7 pages.
State Intellectual Property Office of P.R.C., "Notification of the First Office Action," issued in connection with Chinese Patent Application No. 201711383216.0, dated Jan. 17, 2019, 11 pages.
United States Patent and Trademark Office, "Notice of Allowance and Fee(s) Due," issued in connection with U.S. Appl. No. 14/703,570, dated Mar. 12, 2019, 17 pages.

* cited by examiner

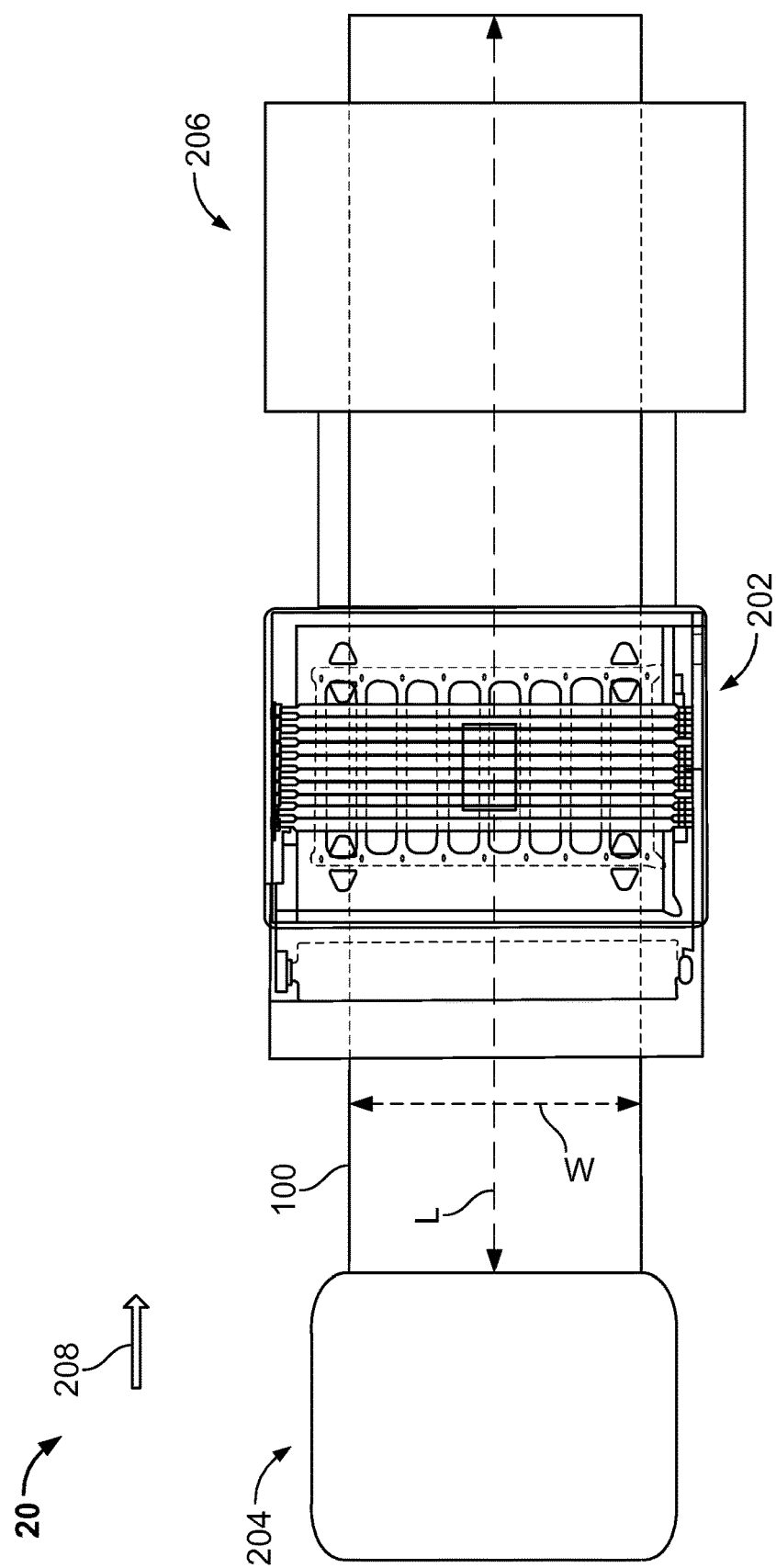

METHODS AND APPARATUS TO MONITOR MATERIAL CONDITIONING MACHINES

RELATED APPLICATION

This patent arises from a continuation-in-part of U.S. application Ser. No. 13/839,809, (Now U.S. Pat. No. 9,021,844), which was filed on Mar. 15, 2013, and is hereby incorporated herein by reference in its entirety.

FIELD OF THE DISCLOSURE

The present disclosure relates generally to material conditioning machines, and more particularly, to methods and apparatus to monitor material conditioning machines.

BACKGROUND

Material conditioners have long been used in processing strip material used in connection with mass production or manufacturing systems. In a manufacturing system, a strip material (e.g., a metal) is typically removed from a coiled quantity of the strip material. However, uncoiled rolled metal or strip material may have certain undesirable characteristics such as, for example, coil set, longbow, crossbow, etc. due to shape defects and internal residual stresses resulting from the manufacturing process of the strip material and/or storing the strip material in a coiled configuration.

To achieve a desired material condition, a strip material removed from a coil often requires conditioning (e.g., flattening and/or leveling) prior to subsequent processing in a roll forming machine, a stamping machine, a laser cutter and/or other machine(s). For optimum part production, a strip material should have uniform flatness along its cross-section and longitudinal length and be free from any shape defects and any internal residual stresses. Flatteners and/or levelers can substantially flatten a strip material to eliminate shape defects and/or release the internal residual stresses as the strip material is uncoiled from the coil roll.

BRIEF DESCRIPTION OF THE DRAWINGS

FIG. 2B is a plan view of the example leveler of FIG. 2A.

DETAILED DESCRIPTION

Figure 1:
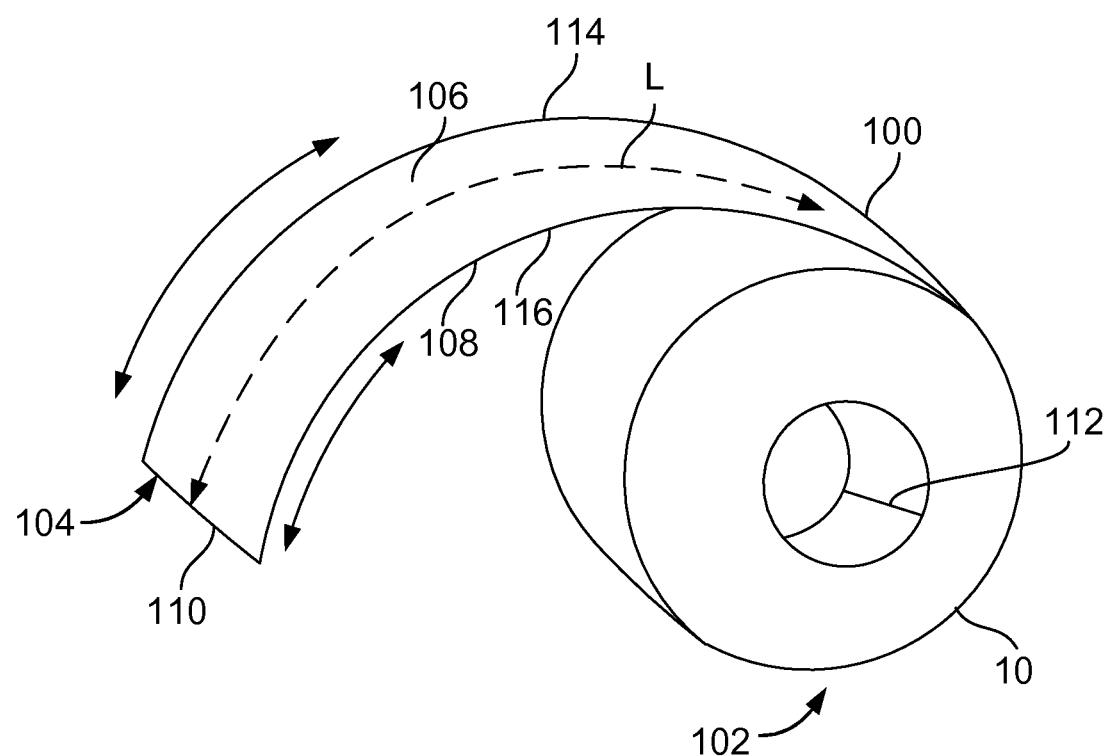
FIG. 1 illustrates an example strip material in a coil condition.

FIG. 1 illustrates a strip material 100 in a coiled condition or state 102. Coiled strip material frequently manifests undesirable material conditions that are the result of longitudinal stretching of the strip material 100 during coiling and/or as a result of remaining in the coiled state 102 for a period of time. In particular, the coil winding process is usually performed under high tension, which may cause a condition commonly referred to as coil set. If significant, coil set may manifest itself as a condition commonly referred to as longbow (e.g., bow up/bow down) causing the strip material 100 to experience curvature (e.g., concavity) along its longitudinal axis. Longbow, for example, is due to a surface-to-surface length differential along a longitudinal length L of the strip material 100 due to the strip material 100 being in the coiled state 102. In other words, the strip material 100 retains curvature (e.g., a curled or curved profile) along the longitudinal length L of the strip material 100. This undesirable condition is manifest in an uncoiled condition or state when the strip material 100 is unwound from a coil or roll 10. For example, due to being in the coiled state 102, a first or upper surface 106 of the strip material 100 is longer (e.g., bent along the longitudinal length L of the strip material 100) relative to a second or lower surface 108 of the strip material 100. As an uncoiled portion 104 is pulled straight, the longer upper surface 106 causes the shorter lower surface 108 to curl or bend (i.e., longbow).

Undesirable material conditions such as longbow can be substantially eliminated using leveling or flattening techniques. Leveling and/or flattening techniques are implemented based on the manners in which strip materials react to stresses imparted thereon (e.g., the amount of load or force applied to a strip material). For example, the extent to which the structure and characteristics of the strip material 100 change is, in part, dependent on the amount of load, force, or stress applied to the strip material 100.

Levelers typically bend a strip material back and forth through a series of work rolls to reduce internal stresses by permanently changing the memory of the strip material 100. More specifically, the work rolls are positioned or nested to a plunge depth position required to plastically deform the strip material. For example, the plunge depth position can be determined by known material characteristics such as, for example, the thickness of the strip material, yield strength of the strip material, composition of the strip material, and/or work roll diameter, etc.

At the plunge depth position, the work rolls apply a plunge force to plastically deform the strip material 100 as the material enters the leveling machine. Bending the strip material 100 using a relatively low plunge force maintains the strip material 100 in an elastic phase such that residual stresses in the strip material 100 remain unchanged. To substantially reduce or eliminate residual stresses, the strip material 100 is stretched beyond the elastic phase to a plastic phase to stretch the strip material 100 across the entire thickness of the strip material 100. The amount of force required to cause a metal to change from an elastic condition to a plastic condition is commonly known as yield strength. The plunge force applied to the strip material 100 can be increased to transition the material from the elastic phase to the plastic phase to substantially reduce or eliminate the residual stresses of the strip material 100 that cause undesired characteristics or deformations (e.g., such as coil set and/or longbow). Specifically, small increases in the force or load applied to the strip material 100 can cause relatively large amounts of stretching (i.e., deformation) to occur.

Although the yield strength of the strip material 100 is constant, the effect of coil set may require a greater force to bend or stretch the trailing edge 112 of the strip material 100 beyond the yield strength of the strip material compared to a force required to bend or stretch the leading edge 110 of the strip material 100 beyond the yield strength of the strip material 100. However, in some examples, if the strip material 100 is processed with a significant plunge force (e.g., too much plunge force is applied to the strip material 100), the plunge force may cause the upper surface 106 to curl toward the lower surface 108 (i.e., up bow). Additionally or alternatively, coil set may vary across a width W of the strip material 100 (e.g., between respective peripheral edges 114 and 116).

As a result, nesting the work rolls based only on a plunge depth position may not account for changes in plunge force needed along different portions (e.g., lengths) of the strip material 100 as the strip material 100 uncoils from the roll 10. In other words, different amounts of force (e.g., vertical force) may be needed to condition the strip material 100 (e.g., stretch the strip material beyond its yield strength or prevent over stretching) as the strip material 100 is unwound from the roll 10. For example, an insufficient plunge force provided by a plunge depth position of the work rolls may fail to stretch or elongate a portion of the strip material 100 beyond the yield point of the strip material 100, which may result in relatively minor or negligible permanent change to internal stresses in the unstretched portion of the strip material 100. When a plunge force applied to a portion of the strip material 100 is removed without having stretched portions of the strip material to the plastic phase, the residual stresses remain in those portions of the strip material 100, causing the strip material 100 to return to its shape prior to the force being applied. In such an instance, the strip material 100 has been flexed, but has not been bent. In some examples, the strip material 100 may be overstretched or processed with significant plunge force or depth, causing the upper surface 106 of the strip material to bow downward toward to the lower surface 108.

The example methods and apparatus disclosed herein monitor for material curvature, concavity or longbow in a strip material and/or provide a strip material 100 having substantially flat characteristics and/or minimal or significantly reduced longbow. To significantly reduce or eliminate longbow from the strip material 100, the example methods and apparatus described herein monitor or measure material curvature (e.g., concavity) to monitor, detect, correct or remove longbow along the longitudinal axis of the length L of the strip material 100. Detection of longbow enables sufficient adjustment of a leveler and/or other flatting machine(s) to apply a sufficient force to a strip material to effectively remove longbow effect (e.g. plastically deform the strip material 100) along an entire length of the strip material 100 (e.g., along the longitudinal length L between the leading and trailing edges 110 and 112). More specifically, to detect curvature along the length L of the strip material 100, the example apparatus and methods disclosed herein monitor or detect a measured height value (e.g., a vertical distance differential) between a reference (e.g., a base of a sensor) and the strip material 100 (e.g., the upper surface 106) as the strip material 100 exits the leveler or travels past the last work roll of the leveler.

For example, the example methods and apparatus detect a height or distance (e.g., a vertical gap or space) between a reference point and the upper surface 106 of the strip material 100 measured at a position or point of the strip material 100 as the strip material 100 exits the leveler machine and travels away from the leveler machine. The measured height value is compared to a predetermined reference value. Deviation between the measured height value relative to the predetermined reference value is monitored to detect material curvature. In particular, a measured height or distance that deviates from the predetermined reference value by a threshold value is indicative of longbow being present in the strip material 100. A difference between the measured height or distance and the predetermined reference value may be either a positive value or a negative value, which indicates the direction and magnitude to detect up bow or down bow.

An example predetermined threshold value may be obtained by measuring a height or distance (e.g., a vertical gap or space) between the reference point (e.g., a base of a sensor) and the upper surface 106 of the strip material 100 when the strip material is known to be substantially free of material defects and/or has desired flatness characteristics. For example, an operator may shear or cut the strip material to visually inspect for desired and/or sufficient material characteristics. The strip material is then positioned on the leveler when the leveler is in an open position (e.g., a non-plunge position). The leveler is adjusted until a lowermost point of an upper work roll at the exit of the leveler and the uppermost point of a lower work roll at the exit of the leveler are spaced (e.g., vertically) by a value substantially equal to a thickness (e.g., a distance between the upper and lower surfaces 106 and 108) of the strip material 100. Thus, the lowermost point of the upper work roll engages the upper surface 106 of the strip material and the uppermost point of the lower work roll engages the lower surface 108 of the strip material 100. A distance between the reference (e.g., a base of the sensor) and the upper surface 106 of the strip material 100 is measured and stored as the predetermined reference value.

During operation when the strip material is processed, any deviation between the measured height value and the predetermined reference value that is outside of a threshold (e.g., a threshold range between approximately 0.1% and 5% of the predetermined reference value) indicates a presence of undesired longbow in strip material. As a result, the example methods and apparatus disclosed herein enable a leveler or other flatting machine to change a plunge force (e.g., increase or reduce) applied to the strip material 100 sufficient to yield (e.g., plastically deform) the strip material to correct for longbow (e.g., up bow/down bow). A difference between the measured height value and the predetermined reference value that is equal to or within a threshold indicates that longbow in the strip material is substantially removed or corrected, thereby providing significantly improved flatness properties and/or flat laser burning properties in the strip material after leveling. A difference between the measured height value and the predetermined reference value that is outside of the threshold indicates that longbow is present or detected in the strip material and correction is needed. To correct for longbow, a plunge depth of the leveler is increased or decreased until the measured height value is within a threshold or threshold range of the predetermined reference value, which indicates that longbow has been corrected.

Figure 2A:
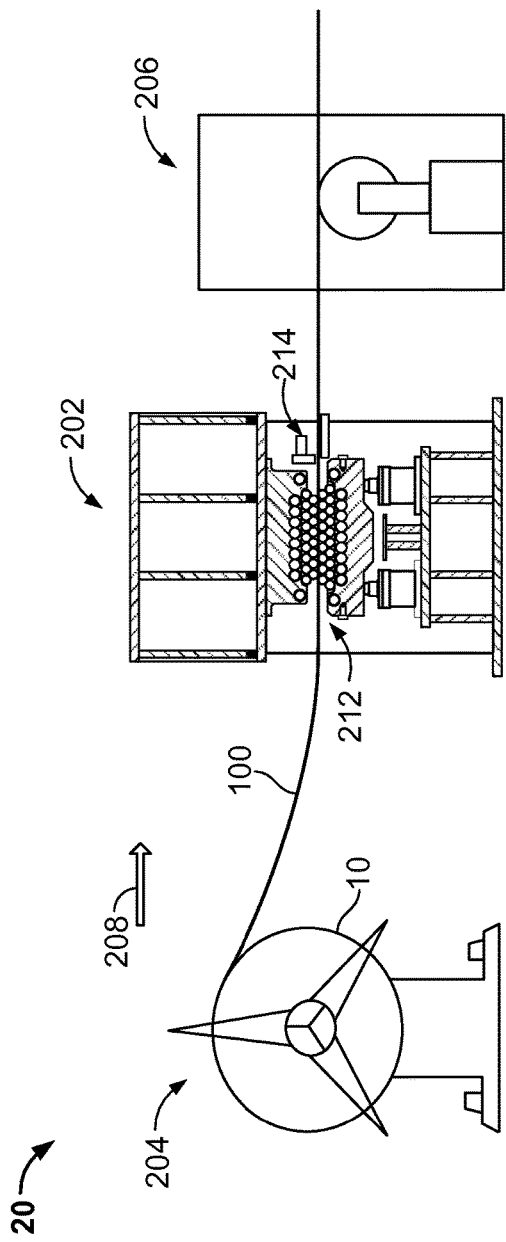
FIG. 2A is a side view of an example production system having an example leveler configured to process a moving strip material constructed in accordance with the teachings disclosed herein.

FIG. 2A is a side view and FIG. 2B is a plan view of an example production system 20 configured to process a moving strip material 100 using an example leveler 202 disclosed herein. In some example implementations, the example production system 20 may be part of a continuously moving strip material manufacturing system, which may include a plurality of subsystems that modify, condition or alter the strip material 100 using processes that, for example, level, flatten, punch, shear, and/or fold the strip material 100. In alternative example implementations, the leveler 202 may be implemented as a standalone system.

In the illustrated example, the example leveler 202 may be placed between an uncoiler 204 and a subsequent operating unit 206. In the illustrated example, the strip material 100 travels from the uncoiler 204, through the leveler 202, and to the subsequent operating unit 206 in a direction generally indicated by arrow 208. The subsequent operating unit 206 may be a continuous material delivery system that transports the strip material 100 from the leveler 202 to a subsequent operating process such as, for example, a punch press, a shear press, a roll former, a laser cutter, etc. For example, during the leveling operation, subsequent operations (e.g., a cutting operation performed by a laser cutter) may be performed as the strip material 100 moves continuously through the leveler 202. In some examples, a conveyor may be employed to transfer and/or support the strip material 100 between the leveler 202 and the subsequent operating unit 206. In other example implementations, sheets precut from, for example, the strip material 100 can be sheet-fed through the leveler 202.

The strip material 100 may be a metallic substance such as, for example, steel or aluminum, or may be any other deformable material. In a coiled state, the strip material 100 may be subject to variable and asymmetrical distribution of residual stresses along its width W (e.g., a lateral axis) and length L (e.g., a longitudinal axis or centerline) that cause shape defects in the strip material 100. As the strip material 100 is uncoiled or removed from the coiled roll 10, the strip material 100 may assume one or more uncoiled conditions or shape defects such as, for example, coil set and/or longbow. Failure to remove the internal stresses of the strip material 100 may cause an uncoiled portion of the strip material 100 to curve or bow (e.g., upward) and damage, for example, a laser cutter as the strip material 100 is being cut by the laser cutter.

To condition the strip material 100 and remove internal stresses that may cause uncoiled conditions such as coil set or longbow, the strip material 100 travels through the leveler 202. The leveler 202 of the illustrated example employs a plurality of work rolls 212 to reshape or work the strip material 100 to reduce coil set and/or the internal stresses in the strip material 100 and to impart a flat shape on the strip material 100 as the strip material 100 exits the leveler 202. In this manner, removal of the internal stresses significantly prevents the strip material 100 from, for example, bowing and damaging, for example, a laser cutter as the strip material 100 is being cut by the laser cutter. In other words, the internal memory of the strip material 100 is removed via the leveler 202.

To detect or ensure that material curvature (e.g., longbow or bow) is removed from the strip material 100, the example leveler 202 of the illustrated example employs a bow detection apparatus or system 214 in accordance with the teachings disclosed herein. As described in greater detail below, the bow detection system 214 measures a height difference between a reference and the upper surface 106 of the strip material 100 at one or more points or positions along a length of the strip material 100 (e.g., along a centerline L of FIG. 2B) as the strip material 100 exits the leveler 202.

Figure 3:
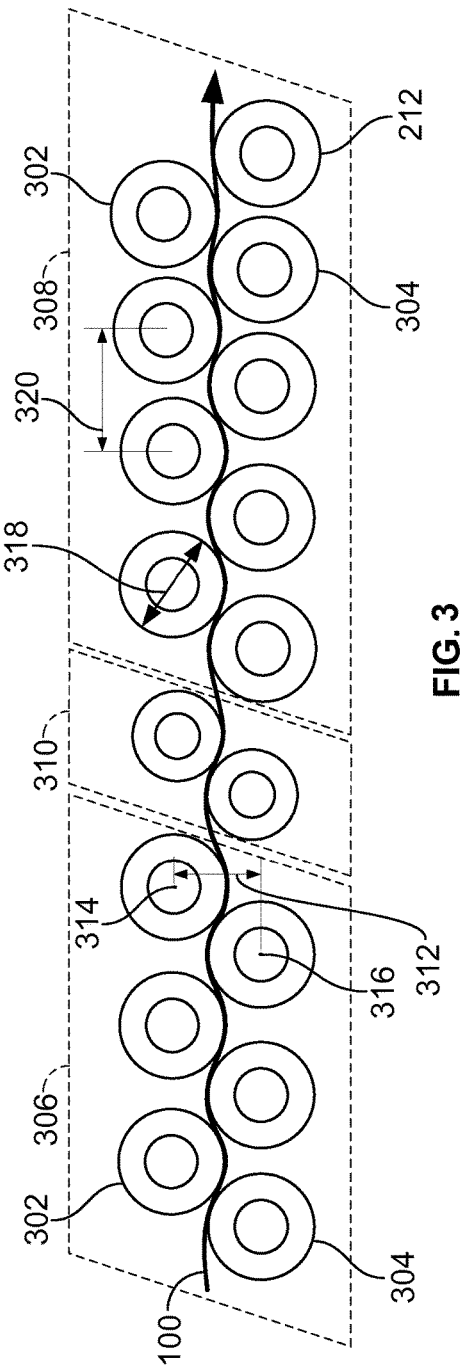
FIG. 3 illustrates an example configuration of work rolls of the example leveler of FIGS. 2A and 2B.

FIG. 3 illustrates an example configuration of the work rolls 212 of the example leveler 202 of FIGS. 2A and 2B. As shown in the illustrated example of FIG. 3, the plurality of work rolls 212 of the leveler 202 are arranged as a plurality of upper work rolls 302 and lower work rolls 304. To reshape or work the strip material 100, the upper work rolls 302 and the lower work rolls 304 are arranged in an offset relationship (e.g., a nested or alternating relationship) relative to one another on opposing sides of the strip material 100 being processed to create a material path that wraps above and below opposing surfaces of the alternating upper and lower work rolls 302 and 304. Engaging opposing surfaces of the strip material 100 using the upper and the lower work rolls 302 and 304 in such an alternating fashion facilitates releasing the residual stresses in the strip material 100 to condition (e.g., flatten, level, etc.) the strip material 100.

In the illustrated example, the upper and lower work rolls 302 and 304 are partitioned into a plurality of entry work rolls 306 and a plurality of exit work rolls 308. The entry work rolls 306 reshape the strip material 100 by reducing the internal stresses of the strip material 100. The exit work rolls 308 adjust any remaining internal stresses of the strip material 100 to impart a flat shape on the strip material 100 as the strip material 100 exits the leveler 202. The leveler 202 of the illustrated example may also employ a plurality of idle work rolls 310 positioned between and in line with the entry work rolls 306 and the exit work rolls 308. For example, the entry and exit work rolls 306 and 308 may be driven via, for example, a motor and the idle work rolls 310 may non-driven, but can be driven in some implementations. In some examples, the entry work rolls 306 may be driven independent of the exit work rolls 308 and the entry work rolls 306 can be controlled independent of the exit work rolls 308. In some examples, the entry work rolls 306 and the exit work rolls 308 may be driven together and/or controlled independently of each other.

The magnitudes of the forces used to condition the strip material 100 depend on the type or amount of reaction the strip material 100 has to being wrapped or bent about a surface of each of the work rolls 212. As shown in FIG. 3, each of the work rolls 212 is used to apply a load (i.e., a plunge force) to the strip material 100. The plunge force applied by each of the work rolls 212 to the strip material 100 is created by increasing a plunge of the work rolls 212 toward the strip material 100. More specifically, to vary the plunge force, a work roll plunge can be varied by changing a center distance or plunge depth 312 between center axes 314 and 316 of the respective upper and lower work rolls 302 and 304. In general, for any given work roll plunge depth or plunge, a decreased distance or increased plunge depth increases the tensile stress imparted to the strip material 100 and, thus, the potential for plastic deformation, which conditions the strip material 100. In the illustrated example, the plunge of the entry work rolls 306 is set to deform the strip material 100 beyond its yield strength and, thus, the plunge of the entry work rolls 306 is relatively greater than a plunge depth of the exit work rolls 308. In some example implementations, the plunge of the exit work rolls 308 can be set so that the exit work rolls 308 do not deform the strip material 100 by any substantial amount but, instead, adjust the shape of the strip material 100 to a flat shape For example, the plunge of the exit work rolls 308 is set so that a separation gap between opposing surfaces of the upper work rolls 302 and the lower work rolls 304 is substantially equal to the thickness of the strip material 100 (e.g., a distance between the upper and lower surfaces 106 and 108 of the strip material 100). The work rolls 212 of the illustrated example have a diameter of approximately 3.5 inches. The upper work rolls 302 of the illustrated example are spaced a lateral distance 320 (e.g., a horizontal distance from center to center) of approximately 3.75 inches. Similarly, the lower work rolls 304 of the illustrated example are spaced a lateral distance (from center to center) of approximately 3.75 inches. However, in other examples, the work rolls may have any other diameter and/or may be spaced laterally by any other distance. In some examples, a lateral distance or space (e.g., a horizontal distance between axes of the work rolls 212) may be adjustable.

Figure 4:
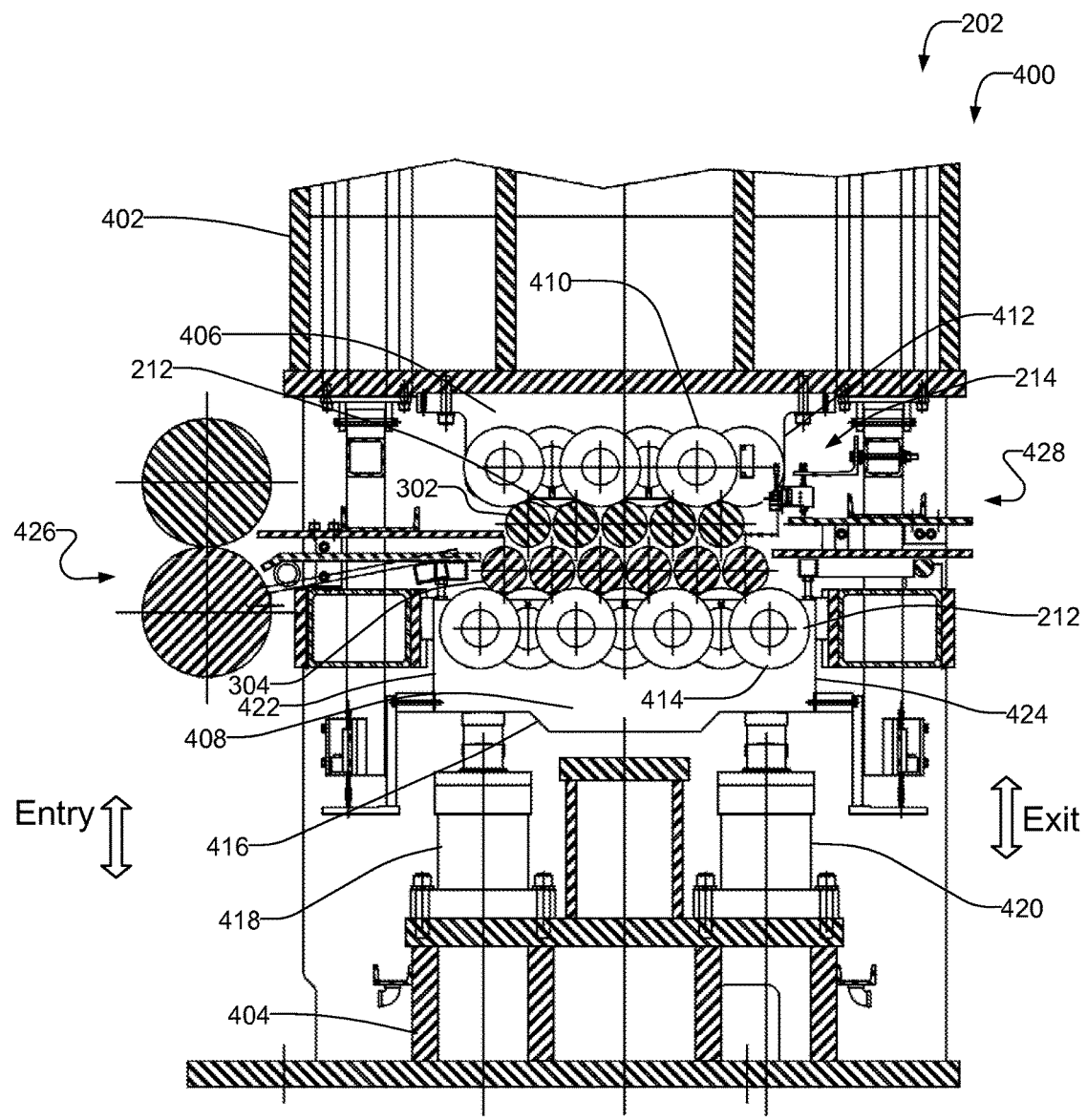
FIG. 4 is a front view of the example leveler of FIGS. 2A, 2B, and 3.

FIG. 4 illustrates a side view of the example leveler 202 of FIG. 2. Referring to FIG. 4, the leveler 202 of the illustrated example has a housing or frame 400 that includes an upper frame 402 and a bottom frame 404. The upper frame 402 of the illustrated example includes an upper backup 406 mounted thereon and the bottom frame 404 includes an adjustable backup 408 mounted thereon. In the illustrated example of FIG. 4, the upper backup 406 is non-adjustable and fixed to the upper frame 402 and the adjustable backup 408 is adjustable relative to the upper backup 406. However, in other example implementations, the upper backup 406 may also be adjustable.

The upper backup 406 of the illustrated example includes a row of backup bearings 410 supported by a non-adjustable flight 412 and the plurality of upper work rolls 302 that are supported by the upper backup bearings 410. Thus, the upper backup bearings 410 fix the upper work rolls 302 in place. The adjustable backup 408 of the illustrated example includes a row of lower backup bearings 414 supported by one or more adjustable flights 416. The lower backup bearings 414 support the plurality of lower work rolls 304. In some examples, intermediate rolls (not shown) may be positioned between the upper backup bearings 410 and the upper work rolls 302 and/or between the lower backup bearings 414 and the lower work rolls 304 to substantially reduce or eliminate work roll slippage that might otherwise damage the strip material 100 or mark relatively soft or polished surfaces of the strip material 100. Generally, journals (not shown) rotatably couple the upper and lower work rolls 302 and 304 to the frame 400 to allow rotation of the work rolls 302 and 304. The work rolls 212 are small in diameter (e.g., between approximately 3 inches and 4 inches) and are backed up by the respective backup bearings 410 and 414 to prevent unwanted deflection along the length of the work rolls 212.

In the illustrated example, the leveler 202 uses the adjustable backup 408 (i.e., adjustable flights) to adjust the plunge or a position of the lower work rolls 304 relative to the fixed upper work rolls 302 (e.g., to increase or decrease a plunge depth between the upper and the lower work rolls 302 and 304). Adjustment of the lower work rolls 304 relative to the fixed upper work rolls 302 may enable substantially continuous or stepwise variation of the plunge of the work rolls 212, thereby enabling a substantially continuous or stepwise variation of the stress imparted to the strip material 100.

More specifically, one or more actuators or hydraulic cylinders 418 and 420 move the lower backup bearings 414 via the adjustable flights 416 to increase or decrease a plunge depth between the upper work rolls 302 and the lower work rolls 304. In particular, the leveler 202 can change the length of the strip material 100 by adjusting the position of the lower work rolls 304 relative to the upper work rolls 302 via the actuators 418 and 420 to create a longer path. Creating a longer path by increasing a plunge of the upper and lower work rolls 302 and 304 causes the strip material 100 to stretch and elongate further than a shorter path created by decreasing a plunge of the work rolls 302 and 304.

In the illustrated example of FIG. 4, the actuator 418 moves a first end 422 of the adjustable flight 416 relative to a second end 424 of the adjustable flight 416 to adjust a position of the lower work rolls 304 relative to the upper work rolls 302 at an entry 426 of the leveler 202 (e.g., the entry work rolls 306 of FIG. 3). The actuator 420 moves the second end 424 of the adjustable flight 416 relative to the first end 422 to adjust the position of the lower work rolls 304 relative to the upper work rolls 302 at an exit 428 of the leveler 202 (e.g., the exit work rolls 308 of FIG. 3). In this manner, the lower backup bearings 414 supported adjacent the first end 422 of the adjustable flight 416 can be positioned at a first distance or height (e.g., a vertical distance) relative to the fixed upper work rolls 302 adjacent the entry 426 and the lower backup bearings 414 supported adjacent the second end 424 of the adjustable flight 416 can be positioned at a second distance or height (e.g., a vertical distance or a distance different from the first height) relative to the fixed upper work rolls 302 adjacent the exit 428. In other example implementations, the position or plunge of the work rolls 212 can be adjusted by moving the upper backup 406 with respect to the adjustable backup 408 using, for example, motor and screw (e.g., ball screw, jack screw, etc.) configurations.

Figure 5:
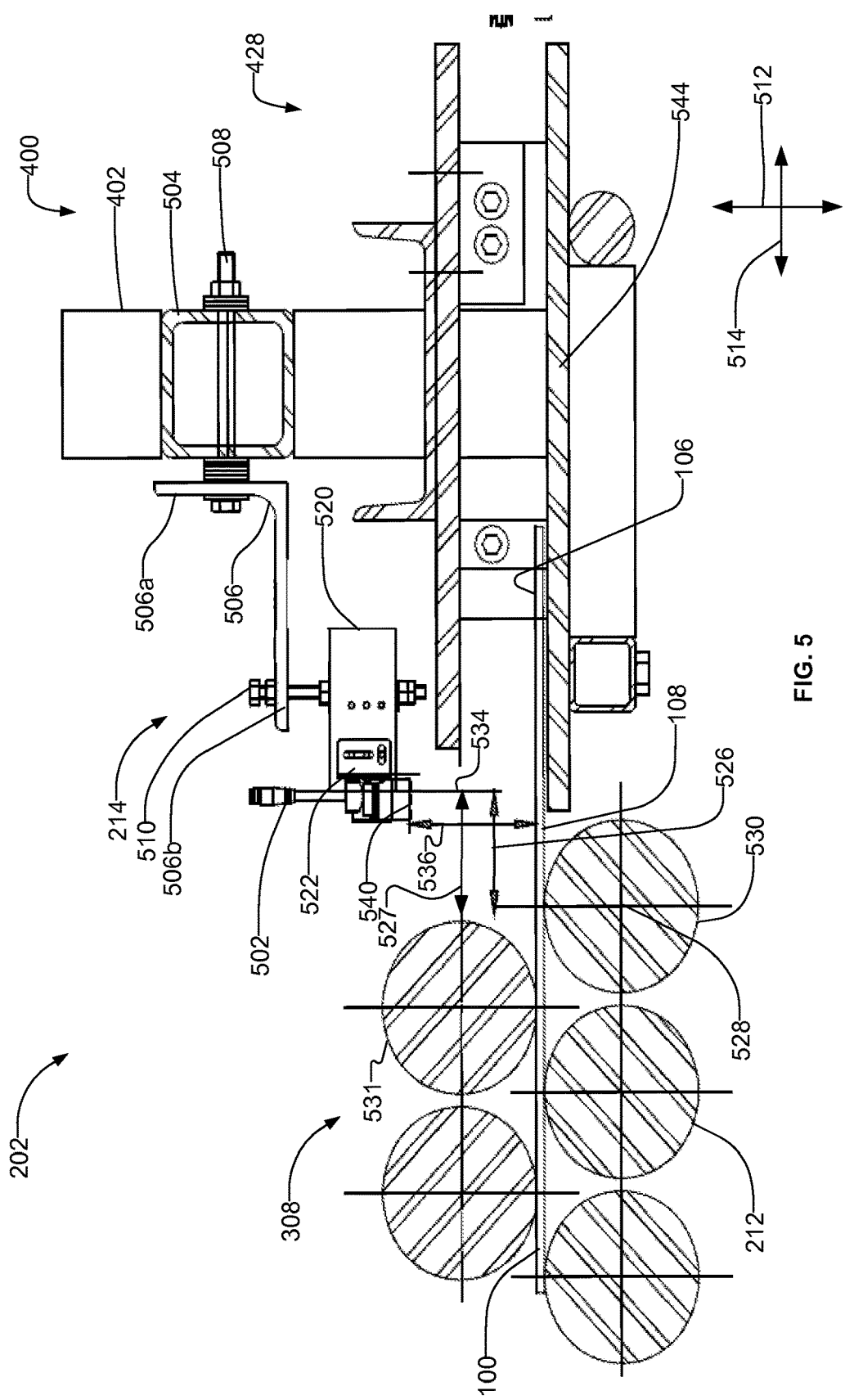
FIG. 5 is an enlarged view of the example leveler of FIGS. 2A, 2B 3 and 4 showing an example bow detection system constructed in accordance with the teachings disclosed herein.

As noted above, to detect material curvature or longbow in the strip material 100, the example leveler 202 of FIG. 204 includes the bow detection system 214. The bow detection system 214 of the illustrated example is positioned at or adjacent the exit 428 of the example leveler 202. FIG. 5 illustrates an enlarged portion of the exit 428 of the example leveler 202 of FIGS. 2-4. More specifically, FIG. 5 illustrates an enlarged view of the example bow detection system or apparatus 214 of FIGS. 2A, 2B and 4. Referring to FIG. 5, the bow detection system 214 of the illustrated example is positioned at or adjacent (e.g., near) the exit 428 of the leveler 202. More specifically, the bow detection system 214 of the illustrated example is positioned within a dimensional envelope or outermost frame of the leveler 202. In some examples the bow detection system 214 is positioned within the frame and/or immediately downstream from the last exit work roll (e.g., between approximately 0.25 and 12 inches from an outer most surface of the last work roll at the exit 428). In this manner, the bow detection system 214 is positioned or mounted inside (e.g., a dimensional envelope of) the leveler 202. Alternatively, the bow detection system 214 may be positioned downstream (e.g., away from the exit 428 or outside a dimensional envelope) of the leveler 202.

The bow detection system 214 of the illustrated example measures or detects material curvature (e.g., concavity, convexity, up bow, down bow, etc.) of the strip material 100 to detect the presence of longbow. To measure or detect material curvature, the example bow detection system 214 of the illustrated example employs a sensor 502. In some examples, the sensor 502 may be a Keyence Model IL-065 sensor manufactured by Keyence America, Inc.

The sensor 502 of the illustrated example is coupled or attached to a frame portion 504 of the frame 400. More specifically, the sensor 502 is supported, coupled or attached to the upper frame 402 of the leveler 202 via a mounting bracket 506. The mounting bracket 506 of the illustrated example is an L-shaped bracket having a first arm 506a coupled to the frame portion 504 and a second arm or portion 506b protruding or cantilevered therefrom to support the sensor 502. More specifically, the first arm 506a of the mounting bracket 506 is coupled to the upper frame 402 via a fastener 508 and the sensor 502 of the illustrated example is coupled to the second portion 506b of the bracket 506 via a fastener 510. The fastener 508 of the illustrated example includes washers and/or adjustable screws to enable adjustment of the sensor 502 in a first direction 512 (e.g., a vertical direction) and a second direction 514 (e.g., a horizontal direction).

The sensor 502 of the illustrated example is coupled or supported by a housing 520. Additionally or alternatively, the sensor 502 of the illustrated example is movably coupled to the housing 520 via a slider 522. More specifically, the slider 522 of the illustrated example enables adjustment of the sensor 502 relative to the housing 520 and/or the strip material 100 in both the first direction 512 (e.g., up and down in a vertical direction) and the second direction 514 (e.g., side to side in a horizontal direction). Thus, the slider 522 of the illustrated example enables adjustment of the sensor 502 relative to (e.g., toward and away from) the upper surface 106 of the strip material 100. Additionally, the housing 520 and/or the slider 522 of the illustrated example also enables adjustment (e.g., lateral, left and right or side to side adjustment in the orientation of FIG. 5) of the sensor 502 relative to the exit 428 of the leveler 202 in the second direction 514 (e.g., in the horizontal direction). The slider 522 of the illustrated example may be configured to enable manual adjustment of the sensor 502 (e.g., via a fastener) and/or automated adjustment of the sensor 502 (e.g., via a stepper motor) in the first and second directions 512 and 514.

As shown in the illustrated example, the sensor 502 is positioned at a position or distance 526 (e.g., a horizontal distance) from a center axis 528 of a work roll 530 of the plurality of work rolls 212. In this example, the work roll 530 is one of the plurality of exit work rolls 308 and is the closest work roll to the exit 428 of the leveler 202. For example, the distance 526 may be between approximately two inches and six inches from the center axis 528 of the work roll 530 and an axis 534 (e.g., a vertical axis) of the sensor 502. In some examples, the sensor 502 may be positioned a distance 527 between an outermost point or surface of an upper work roll 531 and the axis 534 of the sensor 502 that is between approximately two and ten inches.

In the illustrated example, the sensor 502 is also spaced at a (e.g., third) distance 536 (e.g., a vertical distance) from the upper surface 106 of the strip material 100. For example, the sensor 502 (e.g., a reference or the base 540) may be positioned at a distance of between approximately two inches and ten inches away from the upper surface 106 of the strip material 100. Additionally or alternatively, the sensor 502 of the bow detection system 214 of the illustrated example is positioned or aligned relative to the longitudinal axis L (FIG. 2B) of the strip material 100. In other words, the sensor 502 is centered between peripheral edges 114 and 116 of the strip material 100. However, in other examples, the sensor 502 may be offset relative to the longitudinal axis L (FIG. 2B) of the strip material 100.

The bow detection system 214 of the illustrated example includes a plate, platform, and/or conveyor 544 that receives or supports the strip material 100 as the strip material 100 exits the work rolls 212. More specifically, the strip material 100 is supported on the conveyor 544 to prevent or reduce deflection of the strip material 100 in a downward direction as the strip material 100 exits the leveler 202 and moves across the sensor 502 in the second direction 514 (e.g., a deflection caused by the weight of the strip material 100 and gravity). In this manner, the sensor 502 can read or detect more accurately the measured height value representative of the distance 536 between the sensor 502 and the upper surface 106 of the strip material 100, thereby resulting in a more accurate detection of material curvature or longbow.

The sensor 502 of the illustrated example is calibrated or adjusted to provide a predetermined reference value. For example, the sensor 502 of the illustrated example is calibrated such that a base 540 of the sensor 502 provides a reference for measuring a height or vertical distance to the upper surface 106 of the strip material 100. Thus, the base 540 of the sensor 502 may be at a height or distance relative to the upper surface 106 of the strip material 100 representative of a predetermined reference value and/or threshold. For example, to provide the reference point or position (e.g., a reference) for the base 540 of the sensor 502, the sensor 502 of the illustrated example is calibrated to provide an initial or predetermined value or reference (e.g., a distance corresponding to a distance indicative of the strip material 100 having a desired flatness characteristic or substantially free of longbow). In some examples, the reference point or base 540 and/or the reference distance 536 of the sensor 502 is calibrated manually based on operator verification.

During operation, the bow detection system 214 of the illustrated example measures (e.g., continuously or intermittently) the height or distance 536 between the base 540 of the sensor 502 and the upper surface 524 of the strip material 100 as the strip material 100 exits the leveler 202. The measured height value is compared to the predetermined calibrated reference value of the sensor 502. The bow detection system 214 of the illustrated example then calculates a difference between the measured distance 536 and the predetermined reference value (e.g., the calibrated value) to detect material curvature or longbow. The calculated difference is compared to a threshold value (e.g., a near zero value). If a magnitude of the calculated difference between the measured distance 536 and the predetermined reference exceeds a threshold, then the calculated difference is indicative of longbow. Further, a negative or positive value of the calculated difference is indicative of down bow or up bow (e.g., the direction of the longbow). In other words, to detect material curvature or longbow, the example bow detection system 214 of the illustrated example monitors or detects a difference (e.g., a vertical distance differential) between the measured height or distance 536 and the calibrated reference value. For example, a difference between the measured value representative of the distance 536 and the predetermined reference value that is less than a threshold or zero (e.g., has a negative value) is indicative of up bow and a measured difference between the measured values representative of the distance 536 and the predetermined reference value that is greater than a threshold or zero (e.g., has a positive value) is indicative of down bow. Therefore, the sensor 502 also provides an indication of the direction and/or magnitude of stresses present in the strip material 100 that may result in longbow.

As a result, the example methods and apparatus disclosed herein enable the leveler 202 (or other flatting machine) to change or adjust (e.g., increase or reduce) a plunge force (e.g., of the entry work rolls 306) applied to the strip material 100 sufficient to yield (e.g., plastically deform) the strip material 100 to correct for longbow (e.g., up bow/down bow). When the difference between the measured distance and the reference value is substantially zero, longbow or material curvature is substantially removed and the strip material 100 is conditioned to have a substantially flat characteristic. Removal of material curvature significantly reduces stress in the strip material 100 to provide significantly improved flatness properties and/or flat laser burning properties in the strip material 100 after leveling.

In some examples, when the sensor 502 detects that longbow is present (e.g., a difference between the measured height value associated with the distance 536 deviates from the reference value by a threshold value), the example leveler 202 of the illustrated example may provide an indication to an operator to adjust (e.g., either reduce or increase) the plunge depth (e.g., of the entry work rolls 306) of the of the work rolls 212. Additionally or alternatively, the example leveler 202 may automatically adjust the plunge position or depth (e.g., of the entry work rolls 306) of the work rolls 212 based on the strip material 100 characteristics and the detected or measured height differential value. For example, a difference between the measured value representative of the distance 536 and the predetermined reference value of approximately 0.005 inches may require a plunge adjustment (e.g., of the entry work rolls 306) of approximately 0.001 inches to remove or correct material curvature or longbow in the strip material 100. Further, depending on the differential being a negative or positive value, the leveler 202 may be adjusted to increase or decrease the plunge depth (e.g., of the entry work rolls 306) by approximately 0.001 inches. In some examples, if the difference is greater than a threshold value (e.g., a maximum difference value), the example leveler 202 or example production system 20 may generate an alarm and/or automatically stop a production run.

Figure 6:
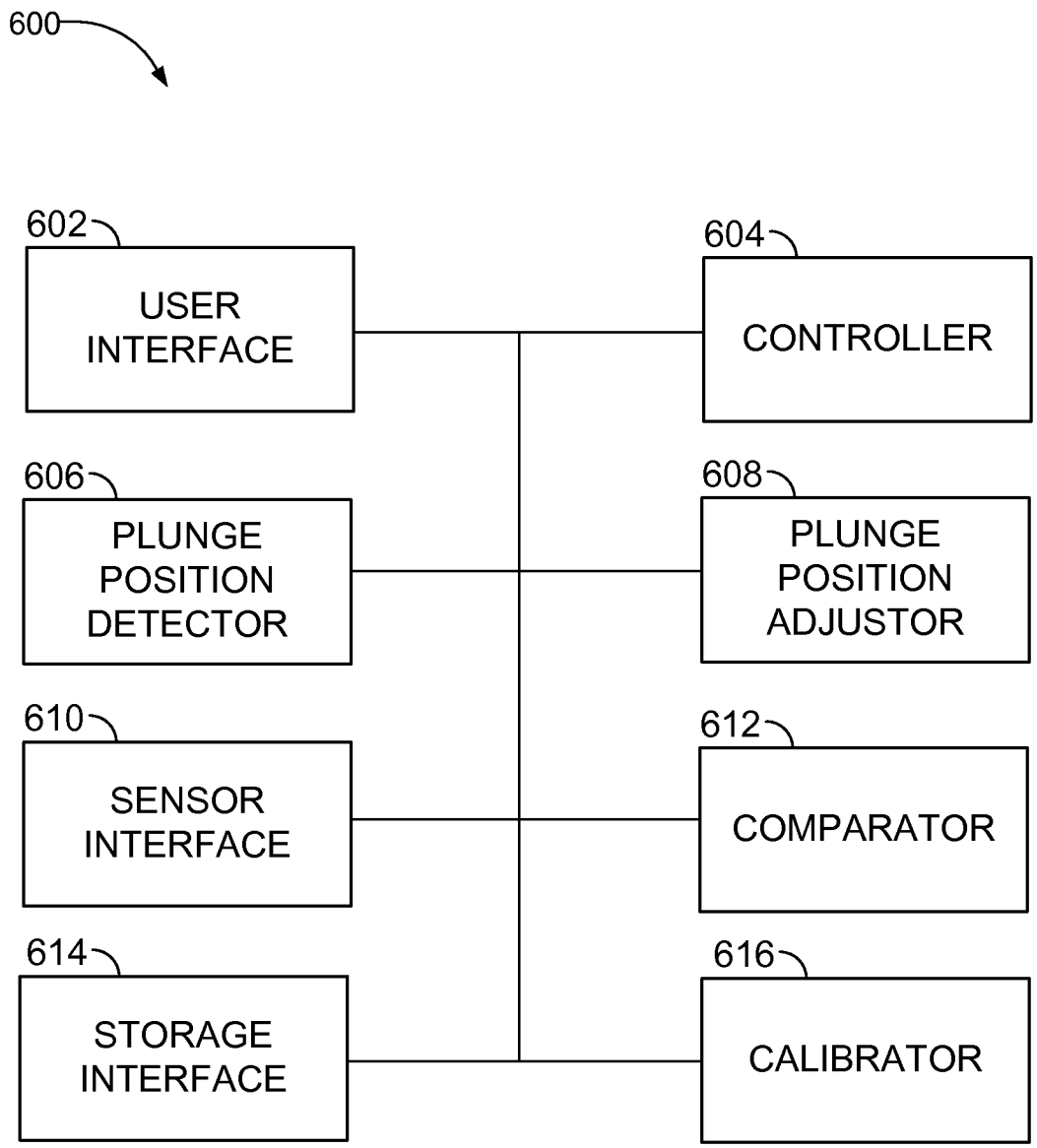
FIG. 6 illustrates an example system that may be used to operate the example leveler of FIGS. 2A, 2B, 3-5.

FIG. 6 is a block diagram of an example apparatus or system 600 for automatically monitoring and conditioning the strip material 100. In particular, the example system 600 may be used in connection with and/or may be used to implement the example leveler 202 of FIGS. 2A, 2B and 3-5 or portions thereof to adjust a plunge depth of the work rolls 212 based on a measured difference detected or provided by the sensor 502. The example system 600 may also be used to implement a feedback process to adjust a plunge depth of the entry and/or exit work rolls 306 and 308 (FIG. 3) to condition the strip material 100 based on the measured height difference provided by the sensor 502.

As shown in FIG. 6, the example system 600 includes a user input interface 602, a controller 604, a plunge position detector 606, a plunge depth or position adjustor 608, a sensor interface 610, a comparator 612, a storage interface 614, and a calibrator 616, all of which may be communicatively coupled as shown or in any other suitable manner.

The user input interface 602 may be configured to determine strip material characteristics. For example, the user input interface 602 may be implemented using a mechanical and/or graphical user interface via which an operator can input the strip material characteristics. The material characteristics can include, for example, a thickness of the strip material 100, the type of material (e.g., aluminum, steel, etc.), yield strength data, etc. In some examples, the storage interface 614 can retrieve a plunge depth value from a look-up table or data structure having start-up plunge depth settings for different material types based on, for example, material thickness values and/or yield strength values received by the user input interface 602. Additionally or alternatively, an operator can manually select the plunge depth of the work rolls 212 by entering a plunge depth valve via the user input interface 602. In other examples, an operator or other user can manually set the initial plunge depth of the work rolls 212. The user input interface 602 may be configured to communicate the strip material characteristics to the controller 604 and/or the plunge position adjustor 608. In some examples, the user input interface 602 can receive the predetermined reference value via, for example, operator input. Such predetermined reference value could be, for example, the result of a manual calibration procedure and input by an operator.

The plunge position adjustor 608 may be configured to obtain strip material characteristics from the user input interface 602 to set the plunge or vertical positions of the work rolls 212 (e.g., the distance between the upper and lower work rolls 302 and 304 of FIG. 3). In some examples, the plunge position adjustor 608 may retrieve predetermined plunge position values from the storage interface 614 and determine the plunge position of the work rolls 212 based on the strip material input characteristics from the user input interface 602.

More specifically, the controller 604 may cause the plunge position adjustor 608 to automatically adjust the entry work rolls 306 and the exit work rolls 308 to predetermined entry and exit work roll plunge depths corresponding to the particular strip material data provided by the user via the user input interface 602. For example, the controller 604 and/or plunge position adjustor 608 can determine the plunge depth of the entry work rolls 306 and/or the exit work rolls 308 required to condition or process the strip material 100 based on the strip material characteristics. For example, the entry work rolls 306 may be adjusted to provide a plunge depth that is deeper (e.g., greater) than the plunge depth of the exit work rolls 308.

To adjust the plunge depth of the work rolls 212, the plunge position adjustor 608 causes the actuators 418 and 420 (FIG. 4) to adjust the plunge depth positions of the entry work rolls 306 and/or the exit work rolls 308. For example, the controller 604 may command the plunge position adjustor 608 to supply or deliver a pressurized control fluid to the actuators 418 and 420 sufficient to position the adjustable flights 416 and, thus, the backup bearings 414 relative to the upper work rolls 302 to provide desired plunge depths.

The plunge position detector 606 may be configured to sense or detect the plunge depth position values of the work rolls 212. For example, the plunge position detector 606 can detect the vertical position or distance between the work rolls 212 (i.e., the upper work rolls 302 and the lower work rolls 304) to achieve a particular plunge depth position. To detect the position of the plunge depth, the plunge position detector 606 receives a position signal value via, for example, position sensors associated with the actuators 418, 420. The plunge position detector 606 can then communicate the plunge depth position value to the controller 604 and/or the comparator 612.

Additionally, the sensor interface 610 may be configured to communicate with the sensor 502. More specifically, the sensor interface 610 may be configured to receive values representative of the measured distances representative of the distance 536 between the base 540 and the upper surface 524 of the strip material 100 provided by the sensor 502. The sensor interface 610 may be configured to communicate the measured values to the comparator 612, the controller 604 and/or the plunge position adjustor 608. In some examples, the sensor interface 610 may be configured to determine or calculate the difference value between the measured value representative of the height or distance 536 provided by the sensor 502 and the predetermined reference value (e.g., provided via the example method 800 of FIG. 8 described below). In some examples, the comparator 612 and/or the controller 604 may be configured to obtain the measured distance values corresponding to the distance 536 from the sensor interface 610 and may be configured to determine the difference value by comparing the measured distance values obtained from the sensor interface 610 and the predetermined reference value (e.g., stored in storage interface). For example, the sensor interface 610, the comparator 612 and/or the controller 604 may be configured to perform comparisons, calculate or otherwise obtain a difference or differential value between the measured values and the predetermined reference value. Based on the comparisons, the sensor interface 610, the comparator 612 and/or the controller 604 can determine if the differential value deviates from a threshold or reference (e.g., a near zero value, etc.). The sensor interface 610, the comparator 612 and/or the controller 604 may then communicate the results of the comparisons to the plunge position adjustor 608 to adjust a plunge depth of the work rolls 212.

The calibrator 616 may be configured to calibrate or determine and/or record the calibrated reference value (e.g., an initial value or reference value indicative of the strip material 100 having a desired flatness characteristic) of the sensor 502. For example, the calibrator 616 may be configured to initiate when a user input command is selected via the user input interface 602. For example, during a pre-production or test run, the calibrator 616 may be configured to calibrate a reference value based on the strip material 100 having substantially flat characteristics. For example, after a visual and/or machine or sensor inspection determines that the strip material 100 is substantially flat, the calibrator 616 may be initiated or configured to record or set the reference value (e.g., a predetermined reference value) at a distance that corresponds to the distance 536 between the base 540 of the sensor 502 and the upper surface 526 of the strip material 100. The calibrator 616 may be configured to communicate this initial position or calibrated reference value to the comparator 612, the sensor interface 610 and/or the controller 604. In some examples, the calibrator 616 may be configured to communicate the calibrated reference value with the storage interface 614, the comparator 612, the controller 604 and/or the sensor interface 610.

In some examples, the calibrator 616 may be configured to (e.g., automatically) initiate a calibration of the sensor 502 prior to beginning a production run (e.g., prior to processing the strip material 100 through the leveler 202). In some examples, calibration plates having a known thickness may be positioned between the upper work rolls 302 and the lower work rolls 304, and the calibrator 616 may be configured to instruct the plunge position adjustor 608 to move the lower work rolls 304 toward the upper work rolls 302 until the upper work rolls 302 and the lower work rolls 304 engage or close against opposing surfaces of the calibration plates. For example, an operator may position the calibration plates between the upper and lower work rolls 302 and 304. Once the work rolls are in the closed position, the calibrator 616 can set the distance value 536 as the predetermined reference value(s) (e.g., a calibrated value).

Figure 9:
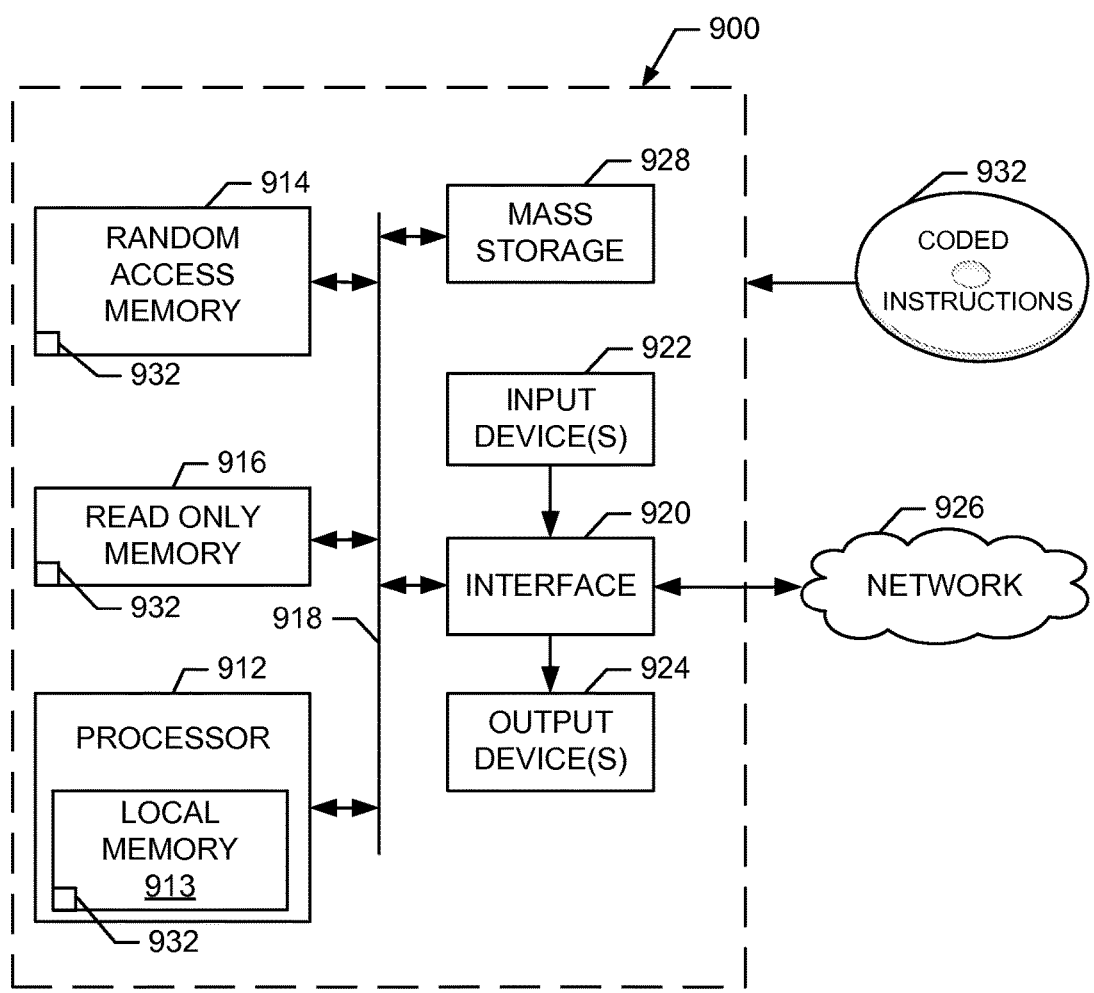
FIG. 9 is a block diagram of an example processor platform that may be used to implement the example methods and apparatus described herein.

The storage interface 614 may be configured to store data values in a memory such as, for example, the system memory 913 and/or the mass storage memory 928 of FIG. 9. Additionally, the storage interface 614 may be configured to retrieve data values from the memory (e.g., a plunge depth position structure and/or a plunge depth pressure structure). For example, the storage interface 614 may access a data structure to obtain plunge position values from the memory and communicate the values to the plunge position adjustor 608. The storage interface 614 may be configured to store the reference value provided by the sensor interface 610 and/or the calibrator 616.

During operation, the distance 536 between the base 540 of the sensor 502 and the upper surface 524 is measured (e.g., continuously, intermittently, etc.) and compared to the predetermined or calibrated reference value (e.g., the calibrated distance value) of the sensor 502. Changes in the distances measured by the sensor 502 compared to the predetermined reference value that is greater than a threshold value (e.g., a near zero value plus or minus 10 millimeters) is indicative of longbow.

While an example manner of implementing the example system 600 is illustrated in FIG. 6, one or more of the elements, processes and/or devices illustrated in FIG. 6 may be combined, divided, re-arranged, omitted, eliminated and/or implemented in any other way. Further, the example user interface 602, the example controller 604, the example plunge position detector 606, the example plunge depth or position adjustor 608, the example sensor module interface 610, the example comparator 612, the example storage interface 614, and the example calibrator interface 616 and/or, more generally, the example system 600 of FIG. 6 may be implemented by hardware, software, firmware and/or any combination of hardware, software and/or firmware. Thus, for example, any of the example user interface 602, the example controller 604, the example plunge position detector 606, the example plunge depth or position adjustor 608, the example sensor module interface 610, the example comparator 612, the example storage interface 614, and the example calibrator interface 616 and/or, more generally, the example system 600 of FIG. 6 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example user interface 602, the example controller 604, the example plunge position detector 606, the example plunge depth or position adjustor 608, the example sensor module interface 610, the example comparator 612, the example storage interface 614, and the example calibrator interface 616 is/are hereby expressly defined to include a tangible computer readable storage device or storage disk such as a memory, a digital versatile disk (DVD), a compact disk (CD), a Blu-ray disk, etc. storing the software and/or firmware. Further still, the example system 600 of FIG. 6 may include one or more elements, processes and/or devices in addition to, or instead of, those illustrated in FIG. 6, and/or may include more than one of any or all of the illustrated elements, processes and devices.

Figure 7:
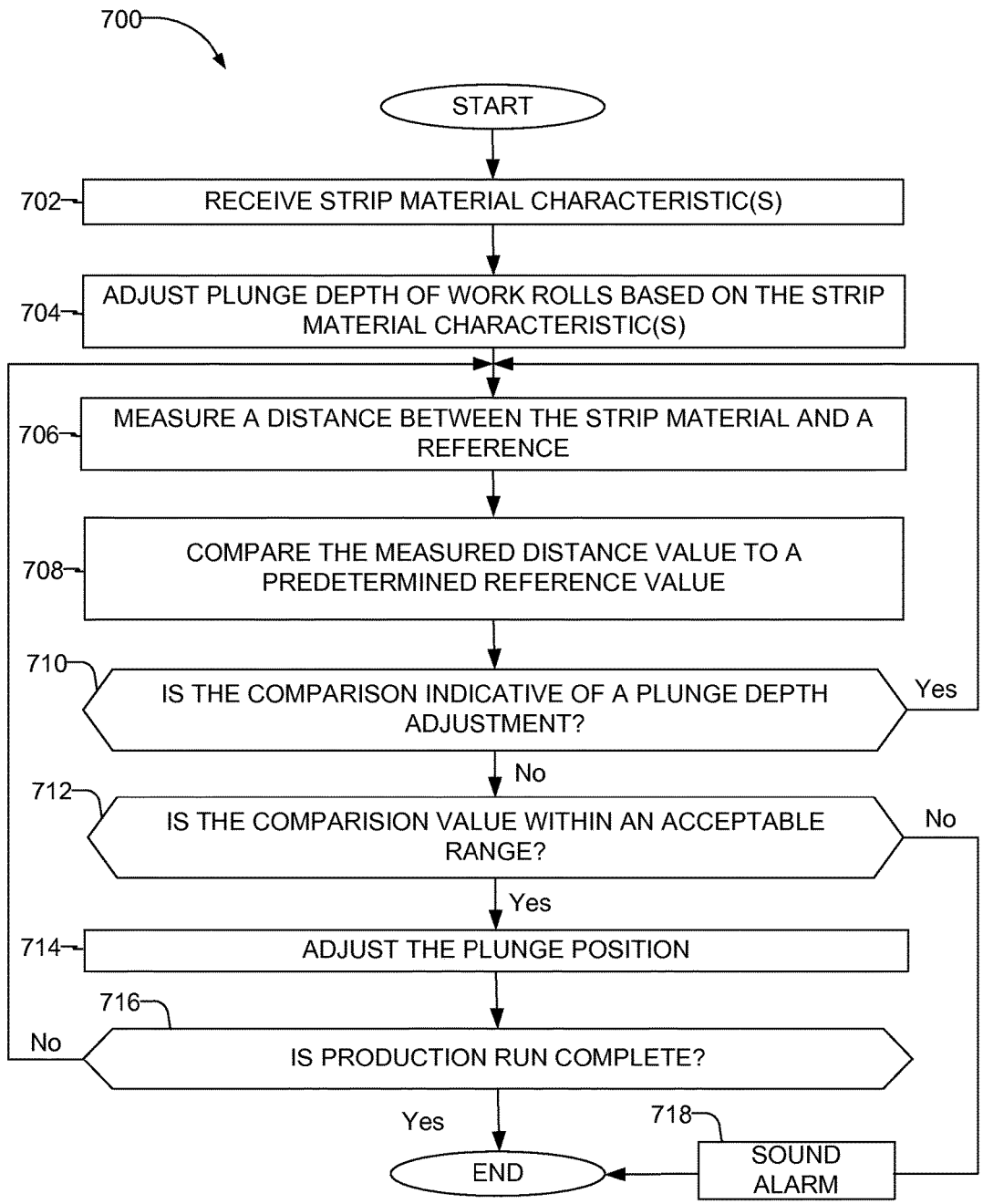
FIG. 7 illustrates a representative of example machine readable instructions for implementing the example system of FIG. 6.
Figure 8:
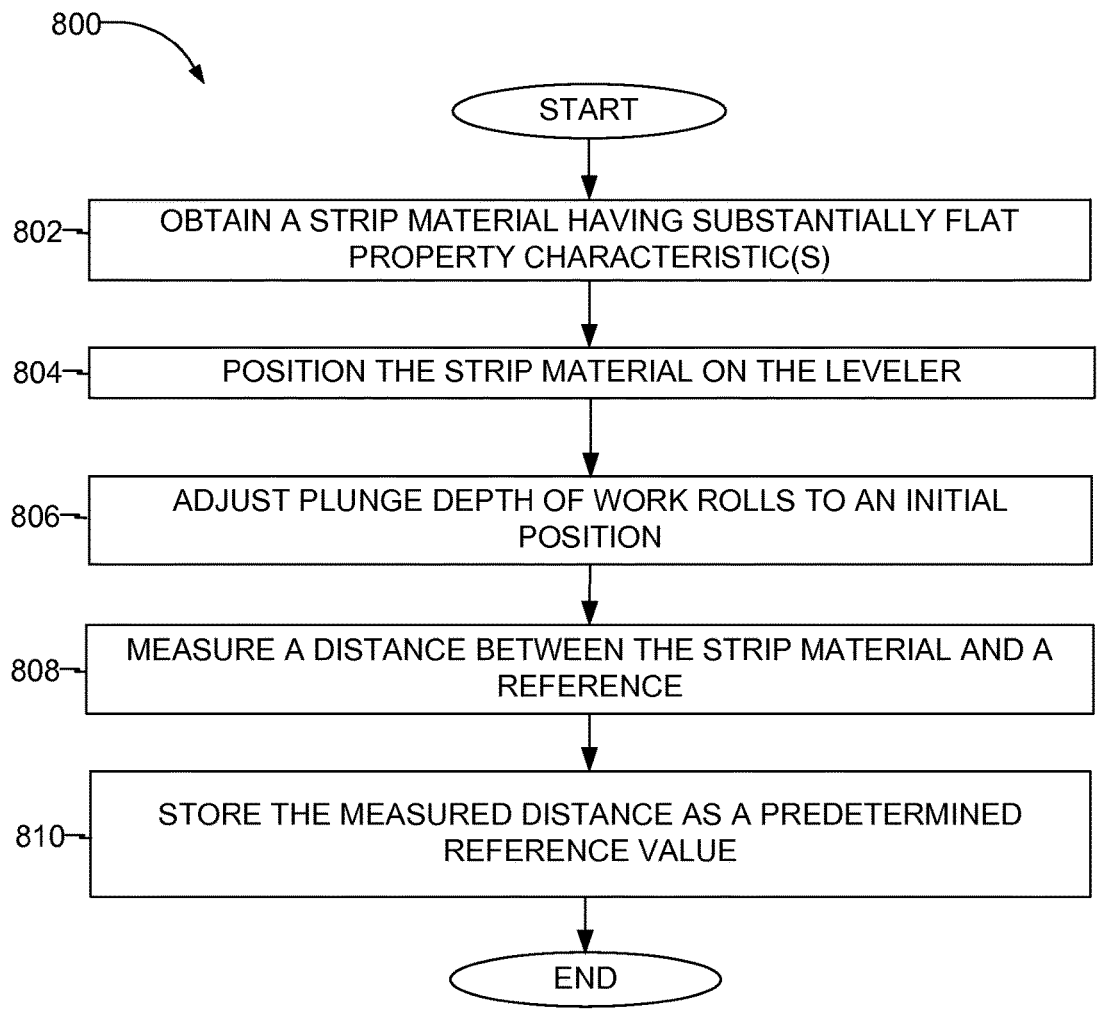
FIG. 8 illustrates an example method for calibrating a sensor of the example leveler of FIGS. 2A, 2B and 3-5 and/or to implement the example system of FIG. 6.

A flow chart representative of example machine readable instructions for implementing the system 600 of FIG. 6 is shown in FIGS. 7 and 8. In this example, the machine readable instructions of FIGS. 7 and 8 comprise a program for execution by a processor such as the processor 912 shown in the example processor platform 900 discussed below in connection with FIG. 9. The program may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flow-chart illustrated in FIGS. 7 and 8, many other methods of implementing the example system 600 may alternatively be used. For example, the order of execution of the blocks may be changed, and/or some of the blocks described may be changed, eliminated, or combined.

As mentioned above, the example process of FIGS. 7 and 8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of processes of FIGS. 7 and 8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

For purposes of discussion, the example method 700 of FIG. 7 is described in connection with the example leveler 202 of FIGS. 2A, 2B, and 3-5 and the example system 600 of FIG. 6. In this manner, each of the example operations of the example method 700 of FIG. 7 and/or the example method 800 of FIG. 8 is an example manner of implementing a corresponding one or more operations performed by one or more of the blocks of the example apparatus 600 of FIG. 6.

Turning in detail to FIG. 7, strip material characteristics information is received (block 702). For example, a user can input the material characteristics via the user input interface 602.

The plunge depth of the work rolls 212 is adjusted based on the strip material characteristics (block 704). For example, the plunge position adjustor 608 delivers pressurized control fluid to the respective actuators 418 and 420. More specifically, as noted above, the plunge position adjustor 608 adjusts the plunge position of the work rolls 212 at the entry 426 of the leveler 202 (e.g., the entry work rolls 306) and the plunge position of the work rolls 212 at the exit 428 of the leveler 202 (e.g., the exit work rolls 308). Typically, the plunge depth of the entry work rolls 306 is different from the plunge depth of the exit work rolls 308. After the plunge depth is set, the strip material 100 is processed via the leveler 202.

In operation, variations in the forces may be required to plunge the strip material 100 beyond its yield strength due to, for example, the effects of coil set or longbow. As the strip material is fed through the leveler 202, the sensor interface 610 monitors a distance (e.g., a vertical distance) between the strip material 100 and a base or reference location (block 706). For example, the sensor interface 610 monitors and/or reads a distance value corresponding to the distance 536 as the strip material 100 is processed by the leveler 202. For example, the base or reference value may be the calibrated reference value determined during calibration of the sensor 502 by measuring the distance 536 when the strip material 100 has a known flatness characteristic determined via, for example, visual inspection of a sheared portion of the strip material 100.

As the strip material 100 exits the leveler 202, the sensor 502 measures a distance between the strip material 100 and a reference (block 706). For example, the sensor 502 provides a signal representative of a measured distance between the base 540 of the sensor 502 and the upper surface 524 of the strip material 100. For example, the sensor 502 measures the distance between the reference and the strip material 100 continuously or intermittently as the strip material 100 exits the leveler 202. The signal or value measured by the sensor 502 may be communicated to the sensor interface 610, the comparator 612 and/or the controller 604.

The measured distance is compared to the predetermined reference value (block 708). For example, the comparator 612, the sensor interface 610 and/or the controller 604 compares the measured distance representative of the signal provided by the sensor 502 at block 706 and the predetermined reference value. In some examples, the comparator 612, the sensor interface 610 and/or the controller 604 may be configured to determine or calculate the difference between the measured distance value and the predetermined reference value. In some examples, the predetermined reference value is obtained from the storage interface 614 and/or the user input interface 602.

The comparator 612, the sensor interface 610 and/or the controller 604 then determines if the comparison or calculated difference between the first and second measured values is indicative of a plunge depth adjustment (block 710). For example, the comparator 612, the sensor interface 610 and/or the controller 604 determines if the difference between the measured distance value and the predetermined reference value is substantially equal to a threshold (e.g., a zero value). If the calculated difference is equal to the threshold value and/or within a threshold range, then the method 700 returns to block 706. In some examples, the threshold value may have an error or buffer (e.g., a value or range). For example, the error or buffer range may be the threshold value plus or minus a value such as, for example, between approximately 0.001 and 1. Thus, a calculated difference that falls within the threshold range (e.g., the error or buffer range) would result in the calculated difference being equal to the threshold value.

If the calculated difference deviates from the threshold value and/or the threshold range, the comparator 612, the sensor interface 610 and/or the controller 604 determines if the comparison value (e.g., the calculated difference value) is within an acceptable range (block 712). For example, the acceptable range is greater than a threshold range. Thus, the comparison value may be fall within the acceptable range when it is deviates from threshold (e.g., greater than or falls outside of the threshold range) but is within the acceptable range.

If the comparison value (e.g., the calculated difference) is within the acceptable range, then the plunge depth position of the work rolls is adjusted (block 714). For example, the comparator 612, the sensor interface 610 and/or the controller 604 determines a necessary plunge depth adjustment value and causes the plunge position adjustor 608 to adjust (e.g., increase or decrease) a plunge depth of the work rolls 212. For example, the plunge position adjustor 608 adjusts the plunge depth based on the value provided by the calculated difference between the measured distance value and the predetermined reference value. For example, a difference value of approximately 0.005 inches may cause the plunge position adjustor 608 to adjust the plunge of one or more of the work rolls 212 by 0.001 inches. Further, depending on the difference value having a positive or negative value, the adjustment may be toward the closed position (e.g., the work rolls 212 move toward each other) or the open position (e.g., the work rolls 212 move away from each other).

The comparator 612, the sensor interface 610 and/or the controller 604 determines if the production run is complete (block 716). If the production is not complete at block 716, the method 700 returns to block 706. If the comparator 612, the sensor interface 610 and/or the controller 604 determines that the production run is complete at block 716, the method 700 ends.

If the difference value is outside of the acceptable range at block 714, then an alarm is activated (e.g., an audio and/or visual alert is displayed and/or sounded) (block 718). The alarm, for example, alerts an operator to reset the production run. Additionally or alternatively, in some examples, when the alarm is initiated, the comparator 612, the sensor interface 610 and/or the controller 604 may also command the calibrator 616 to initiate (e.g., automatically) a calibration routine to calibrate the sensor 502.

FIG. 8 illustrates an example method 800 for calibrating or setting a predetermined reference value for the sensor 502 of FIGS. 2-5. One or more operations of the example method 800 shown in FIG. 8 may be implemented automatically (e.g., via machine readable instructions) or manually (e.g., via an operator). Thus, in some examples, the calibration of the sensor 502 may be fully automated. Referring to FIG. 8, a strip material having substantially flat and/or desired property characteristics is obtained (block 802). For example, the leveler 202 is adjusted to a particular plunge depth based on the characteristics of the strip material 100. A leveled portion of the strip material 100 is sheared and inspected (e.g., visually inspected) for the presence of longbow (e.g., up bow/down bow). In some examples, an operator inspects the sheared strip material to determine the presence of longbow. In some examples, a sensor or other material characteristic identifier may be positioned adjacent the shear machine and determines the presence of, for example, longbow after the strip material sheared. The material characteristic identifier may then communicate with the example calibrator 616 when a desired material characteristic is obtained. The calibrator 616 may determine, record or otherwise provide the predetermined reference value between the base 540 of the sensor 502 and the upper surface 106 of the strip material 100 based on the material characteristic identifier determination of the strip material having desired characteristics.

When longbow is not present in the test material (i.e., when the portion of the sheared strip material 100 is substantially flat and substantially free of up bow or down bow and/or has desired material characteristics), the inspected strip material is positioned on the leveler (block 804). For example, the operator positions the inspected strip material 100 on the lower work rolls 304 when the lower work rolls 304 are spaced from the upper work rolls 302 such that the upper work rolls 302 do not engage the upper surface of the strip material 100 (e.g., when the leveler 202 is in an open position). In some examples (e.g., when the calibration and/or the shear operation is automated as discussed above), the strip material 100 is kept positioned in the leveler 202 and material inspection occurs via the downstream shearing operation. In some examples, a sensor at the shearing operation or machine detects for longbow and/or desired characteristics and provides a feedback to the leveler 202 when desired characteristics are met.

The plunge depth of the work rolls (vertical distance between the upper and lower work rolls 302 and 304) is adjusted to an initial position (block 806). For example, the operator adjusts (e.g., manually) the plunge depth of the exit work rolls 308 to the initial position. In some examples, the system 600 and/or the plunge adjustor 608 automatically adjusts the plunge depth of the exit work rolls 308 to the initial position. In some examples, if the plunge depth of the work rolls is already at the initial position, the operation represented by block 806 is omitted or skipped. For example, the initial position may be a plunge depth of the exit work rolls 308 set to a thickness of the strip material 100 (e.g., a distance between the upper surface 106 and the lower surface 108). For example, a separation gap between opposing surfaces of the upper work rolls 302 and the lower work rolls 304 of the exit work rolls 308 is substantially equal to the thickness (e.g., a distance between the upper surface 106 and the lower surface 108) of the strip material 100.

When the plunge depth of the work rolls 302 and 304 are adjusted to the initial position, a distance (e.g., the distance 536) between a reference (e.g., the base 540) and the upper surface of the strip material 100 is measured (block 808). For example, the calibrator 616 determines or measures the distance. The measured distance is stored or recorded as the predetermined or calibrated reference value (e.g., threshold value) for the sensor 502 (block 810). For example, the calibrated or predetermined reference value of the distance 536 associated with the sensors 502 is indicated or recorded by the calibrator 616 as reference position or height (e.g., reference value) between the base 540 of the sensor 502 and the upper surface 524 of the strip material 100. The predetermined reference value is then stored via the storage interface 610.

Alternatively, calibration of the sensor 502 and/or obtaining the predetermined reference value may be obtained manually using calibration plates. For example, calibration plates having a known thickness may be positioned between the upper work rolls 302 and the lower work rolls 304. For example, an operator may position the calibration plates between the upper work rolls 302 and the lower work rolls 304 prior to each production run. With the calibration plates positioned between the upper work rolls 302 and the lower work rolls 304, the lower work rolls 304 are moved toward the upper work rolls 302 until the upper work rolls 302 and the lower work rolls 304 engage or close against opposing surfaces of the calibration plates. With the calibration plates in position, the measured height value 536 of the sensor 502 is measured between the base 540 of the sensor 502 and an upper surface of the calibration plates to define the predetermined or calibrated reference value for the sensor 502. For example, the calibrator 616 may determine the measured distance and associate the measured distance as the predetermined reference value. The predetermined reference value may be stored via the storage interface 610.

FIG. 9 is a block diagram of an example processor platform 900 capable of executing or processing the methods or instructions of FIGS. 7 and 8 to implement the apparatus 600 of FIG. 6 and/or the leveler 202 of FIGS. 2A, 2B and 3-5. The processor platform 900 can be, for example, a server, a computer, a programmable logic circuit (PLC), and/or any other type of computing device.

FIG. 9 is a block diagram of an example processor platform 900 capable of executing the instructions of FIGS. 7 and 8 to implement the system 600 of FIG. 6. The processor platform 900 can be, for example, a server, a personal computer, a mobile device (e.g., a cell phone, a smart phone, a tablet such as an iPad™), a personal digital assistant (PDA), an Internet appliance or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIGS. 7 and 8 may be stored in the mass storage device 928, in the volatile memory 914, in the non-volatile memory 916, and/or on a removable tangible computer readable storage medium such as a CD or DVD.

At least some of the aforementioned examples include one or more features and/or benefits including, but not limited to, the following:

In some examples, a system includes a plurality of work rolls to process a continuous strip material positioned between an entry and an exit of an apparatus. A sensor determines a measured distance between an upper surface of the strip material and a reference location, the sensor being downstream from the exit of the apparatus. A controller determines a difference value between the measured distance and a predetermined distance to detect material curvature in the strip material.

In some examples, the controller detects material curvature along a longitudinal length of the strip material when the difference value deviates from a threshold value.

In some examples, the threshold value is zero.

In some examples, the predetermined distance value is a reference position or height between a base of the sensor and the upper surface of the strip material indicative of the strip material having a desired flatness characteristic.

In some examples, the predetermined distance is a calibrated height between the upper surface of the strip material and a base of the sensor determined when the strip material is substantially free of material curvature or longbow.

In some examples, the sensor is only one sensor.

In some examples, the sensor is aligned with a center longitudinal axis of the strip material, the center longitudinal axis being parallel to a direction of travel of the strip material between the entry and the exit.

In some examples a plunge adjustor adjusts a plunge depth of the work rolls when the difference value deviates from a threshold value.

In some examples, the sensor is mounted to a frame of the apparatus adjacent the exit.

In some examples, the sensor is coupled to the frame via a slider that enables independent adjustment of the sensor in a first direction relative to at least one of the frame or the strip material and a second direction non-parallel to the first direction.

In some examples, the sensor is mounted at a lateral distance from a central axis of a work roll adjacent the exit of the apparatus.

In some examples, a method to detect material curvature in a strip material includes processing a strip material via a plurality of work rolls positioned between an entry and an exit of an apparatus; obtaining, via a sensor, a measured distance value between an upper surface of the strip material and a reference location downstream from the exit of the apparatus as the strip material exits the work rolls; and comparing, via a controller, the measured distance value and a predetermined distance to detect material curvature in the strip material.

In some examples, the method includes comparing the measured distance value and the predetermined distance comprises calculating a difference value between the measured distance value and the predetermined distance value.

In some examples, the method includes adjusting a plunge depth of the work rolls if the difference value deviates from a threshold value.

In some examples, the method includes determining whether the difference value is a positive value or a negative value and increasing or decreasing the plunge value based on the difference value being positive or negative.

In some examples, the method includes detecting material curvature indicative of longbow along a longitudinal length of the strip material when the difference value deviates from a threshold value.

In some examples, the method includes determining the predetermined distance by measuring a distance value between the upper surface of the strip material and a base of the sensor when the strip material has a desired flatness characteristic.

In some examples, the method includes determining the predetermined distance by calibrating a height between the upper surface of the strip material and a base of the sensor when the strip material is substantially free of material curvature or longbow.

In some examples, a machine accessible medium having instructions stored thereon that, when executed, cause a machine to at least process a strip material via a plurality of work rolls positioned between an entry and an exit of an apparatus; obtain, via a sensor, a measured distance value between an upper surface of the strip material and a reference location downstream from the exit of the apparatus as the strip material exits the work rolls; and compare, via a controller, the measured distance value and a predetermined distance to detect material curvature in the strip material.

In some examples, the machine accessible medium having instructions stored thereon that, when executed, cause the machine to calculate a difference value between the measured distance value and the predetermined distance value.

In some examples, the machine accessible medium having instructions stored thereon that, when executed, cause the machine to adjust a plunge depth of the work rolls if the difference value deviates from a threshold value.

In some examples, the machine accessible medium having instructions stored thereon that, when executed, cause the machine to determine whether the difference value is a positive value or a negative value and increasing or decreasing the plunge value based on the difference value being positive or negative.

In some examples, the machine accessible medium having instructions stored thereon that, when executed, cause the machine to detect material curvature indicative of longbow along a longitudinal length of the strip material when the difference value deviates from a threshold value.

In some examples, the machine accessible medium having instructions stored thereon that, when executed, cause the machine to determine the predetermined distance by measuring a distance value between the upper surface of the strip material and a base of the sensor when the strip material has a desired flatness characteristic.

In some examples, the machine accessible medium having instructions stored thereon that, when executed, cause the machine to determine the predetermined distance by calibrating a height between the upper surface of the strip material and a base of the sensor when the strip material is substantially free of material curvature or longbow.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed:

1. A system comprising:
    a plurality of work rolls to process a continuous strip material positioned between an entry and an exit of an apparatus;
    a sensor to determine a measured distance between an upper surface of the strip material and a reference location, the sensor mounted to a frame of the apparatus downstream from the exit of the apparatus, wherein the sensor is coupled to the frame via a slider, the slider to enable independent adjustment of the sensor in a first direction relative to at least one of the frame or the strip material and a second direction non-parallel to the first direction; and
    a controller to determine a difference value between the measured distance and a predetermined distance to detect material curvature in the strip material.

2. The system of claim 1, wherein the controller detects material curvature along a longitudinal length of the strip material when the difference value deviates from a threshold value.

3. The system of claim 2, wherein the threshold value is zero.

4. The system of claim 1, wherein the predetermined distance value is a reference position or height between a base of the sensor and the upper surface of the strip material indicative of the strip material having a desired flatness characteristic.

5. The system of claim 1, wherein the predetermined distance comprises a calibrated height between the upper surface of the strip material and a base of the sensor determined when the strip material is substantially free of material curvature or longbow.

6. The system of claim 1, wherein the sensor comprises only one sensor.

7. The system of claim 1, wherein the sensor is aligned with a center longitudinal axis of the strip material, the center longitudinal axis being parallel to a direction of travel of the strip material between the entry and the exit.

8. The system of claim 1, further comprising a plunge adjustor to adjust a plunge depth of the work rolls when the difference value deviates from a threshold value.

9. The system of claim 1, wherein the sensor is mounted at a lateral distance from a central axis of a work roll adjacent the exit of the apparatus.

10. A method to detect material curvature in a strip material, the method comprising:
    processing a strip material via a plurality of work rolls positioned between an entry and an exit of an apparatus;
    determining, via a sensor coupled to a frame of the apparatus downstream from an exit of the apparatus via a slider configured to enable independent adjustment of the sensor in a first direction relative to at least one of the frame or the strip material and a second direction non-parallel to the first direction, a measured distance value between an upper surface of the strip material and a reference location downstream from the exit of the apparatus as the strip material exits the work rolls; and
    comparing, via a controller, the measured distance value and a predetermined distance to detect material curvature in the strip material.

11. The method of claim 10, wherein comparing the measured distance value and the predetermined distance comprises calculating a difference value between the measured distance value and the predetermined distance value.

12. The method of claim 11, further comprising adjusting a plunge depth of the work rolls if the difference value deviates from a threshold value.

13. The method of claim 12, further comprising determining whether the difference value is a positive value or a negative value and increasing or decreasing the plunge value based on the difference value being positive or negative.

14. The method of claim 11, further comprising detecting material curvature indicative of longbow along a longitudinal length of the strip material when the difference value deviates from a threshold value.

15. The method of claim 10, further comprising determining the predetermined distance by measuring a distance value between the upper surface of the strip material and a base of the sensor when the strip material has a desired flatness characteristic.

16. The method of claim 10, further comprising determining the predetermined distance by calibrating a height between the upper surface of the strip material and a base of the sensor when the strip material is substantially free of material curvature or longbow.

17. A machine accessible medium having instructions stored thereon that, when executed, cause a machine to at least:
process a strip material via a plurality of work rolls positioned between an entry and an exit of an apparatus;
determine a measured distance value between an upper surface of the strip material and a reference location downstream from the exit of the apparatus as the strip material exits the work rolls via a sensor coupled to a frame of the apparatus downstream from the exit of the apparatus via a slider configured to enable independent adjustment of the sensor in a first direction relative to at least one of the frame or the strip material and a second direction non-parallel to the first direction; and
compare, via a controller, the measured distance value and a predetermined distance to detect material curvature in the strip material.

18. The machine accessible medium as defined in claim 17 having instructions stored thereon that, when executed, cause the machine to calculate a difference value between the measured distance value and the predetermined distance value.

19. The machine accessible medium as defined in claim 18 having instructions stored thereon that, when executed, cause the machine to adjust a plunge depth of the work rolls if the difference value deviates from a threshold value.

20. The machine accessible medium as defined in claim 19 having instructions stored thereon that, when executed, cause the machine to determine whether the difference value is a positive value or a negative value and increasing or decreasing the plunge value based on the difference value being positive or negative.

21. The machine accessible medium as defined in claim 18 having instructions stored thereon that, when executed, cause the machine to detect material curvature indicative of longbow along a longitudinal length of the strip material when the difference value deviates from a threshold value.

22. The machine accessible medium as defined in claim 17 having instructions stored thereon that, when executed, cause the machine to determine the predetermined distance by measuring a distance value between the upper surface of the strip material and a base of the sensor when the strip material has a desired flatness characteristic.

23. The machine accessible medium as defined in claim 17 having instructions stored thereon that, when executed, cause the machine to determine the predetermined distance by calibrating a height between the upper surface of the strip material and a base of the sensor when the strip material is substantially free of material curvature or longbow.

* * * * *